US012525823B2

United States Patent
Liu et al.

(10) Patent No.: US 12,525,823 B2
(45) Date of Patent: Jan. 13, 2026

(54) ASK MODULATION AND DEMODULATION SYSTEM

(71) Applicant: Halo Microelectronics International, Campbell, CA (US)

(72) Inventors: Rui Liu, Fremont, CA (US); Lijie Zhao, San Jose, CA (US); Feng Zhou, San Jose, CA (US)

(73) Assignee: Halo Microelectronics International, Campbell, CA (US)

( * ) Notice: Subject to any disclaimer, the term of this patent is extended or adjusted under 35 U.S.C. 154(b) by 786 days.

(21) Appl. No.: 17/853,575

(22) Filed: Jun. 29, 2022

(65) Prior Publication Data

US 2024/0006918 A1    Jan. 4, 2024

(51) Int. Cl.
| | |
|---|---|
| *H02J 50/12* | (2016.01) |
| *H02M 1/00* | (2007.01) |
| *H04B 5/24* | (2024.01) |
| *H04B 5/79* | (2024.01) |
| *H04L 27/04* | (2006.01) |

(52) U.S. Cl.
CPC ........... *H02J 50/12* (2016.02); *H02M 1/0025* (2021.05); *H04B 5/24* (2024.01); *H04B 5/79* (2024.01); *H04L 27/04* (2013.01)

(58) Field of Classification Search
CPC ........ H02J 50/12; H02J 50/80; H02J 7/00032; H02J 7/007; H02J 7/00712; H02M 1/0025; H02M 7/05; H02M 7/219; H02M 7/4815; H02M 7/4818; H04B 5/24; H04B 5/79; H04L 27/04

USPC .......................................................... 320/108
See application file for complete search history.

(56) References Cited

U.S. PATENT DOCUMENTS

| | | | |
|---|---|---|---|
| 7,696,724 B2* | 4/2010 | Soyer ................. | G01R 31/3648 320/132 |
| 11,218,347 B2* | 1/2022 | Mehas ................ | H02M 7/125 |
| 11,545,857 B2* | 1/2023 | Peralta ................ | H02J 50/502 |
| 12,283,824 B2* | 4/2025 | Hong ................... | H04B 5/79 |
| 2017/0095667 A1* | 4/2017 | Yakovlev ............ | A61B 5/0022 |
| 2021/0385114 A1* | 12/2021 | Mehas ................ | H02M 7/219 |
| 2023/0084847 A1* | 3/2023 | Huang ................ | H04L 27/14 375/269 |

FOREIGN PATENT DOCUMENTS

WO     WO-2022235967 A1 * 11/2022 ............ H02J 50/004

\* cited by examiner

*Primary Examiner* — M Baye Diao
(74) *Attorney, Agent, or Firm* — AP3 Law Firm PLLC

(57) ABSTRACT

In an embodiment method, an envelope voltage of a resonant capacitor of a wireless power receiver in a wireless charging system may be detected at an output node. One or more parameters of the wireless power receiver may be adjusted in order keep the envelope voltage within a pre-determined voltage range. The one or more parameters includes a capacitance across a receiving coil and the resonant capacitor, or a current of a sub-circuit connected between the output node and a ground. An amplitude shift keying (ASK) carrier signal may be detected at a wireless power transmitter of the wireless charging system and attenuated. A demodulated ASK signal may be generated from the attenuated ASK carrier signal based on peak values of the attenuated ASK carrier signal and a zero-crossing signal generated from the attenuated ASK carrier signal.

18 Claims, 15 Drawing Sheets

ASK MODULATION AND DEMODULATION SYSTEM

TECHNICAL FIELD

The present disclosure relates generally to induction based wireless charging systems, and, in particular embodiments, to an ASK modulation and demodulation system.

BACKGROUND

Wireless battery charging becomes more and more popular in electronic devices, such as smartphones, tablets, and wearable devices. For wireless battery charging, the energy transmitted from a wireless power transmitter (Tx) is in the form of magnetic field, and a wireless power receiver (Rx) is used to convert the magnetic field energy into electrical energy to charge a battery or power up a system. There is no electrical connection between the Tx and Rx. In a charging system, feedback is provided between the wireless power Rx and wireless power Tx (from Rx to Tx) to control the amount of energy being transmitted by the Tx in order to charge the battery or power up the system safely. For Wireless Power Consortium (WPC) standard (also referred to as Qi standard) based wireless charging systems, a feedback loop is accomplished through the ASK (Amplitude Shift Keying) method. The ASK method modulates the amplitude of a carrier (e.g., a power transfer signal) with low frequency ASK coding (with a low frequency ASK signal). The ASK method requires ASK modulation at the Rx side and ASK demodulation at Tx side.

The ASK method may work properly in general. However, under some operating conditions (e.g., for certain output voltage and current of a wireless charging system), the ASK modulation and demodulation may not function properly, causing wireless charging disconnection issues. It is desirable to develop ASK modulation and demodulation methods that can at least mitigate or avoid the issues.

SUMMARY

Technical advantages are generally achieved, by embodiments of this disclosure which describe an ASK modulation and demodulation system.

In accordance with an aspect of the present disclosure, a method is provided that includes detecting, at an output node of a wireless power receiver of a wireless charging system, an envelope voltage of a resonant capacitor of the wireless power receiver. The wireless power receiver includes a receiving coil and the resonant capacitor connected in series, and a full-bridge rectifier. The method further includes determining whether the envelope voltage at the output node is within a pre-determined voltage range. The method also includes: when the envelope voltage is out of the pre-determined voltage range, controlling to adjust one or more parameters of the wireless power receiver based on the envelope voltage, in order for the envelope voltage at the output node of the wireless power receiver to fall within the pre-determined voltage range. The one or more parameters includes a capacitance across the receiving coil and the resonant capacitor, or a current of a sub-circuit connected between the output node and a ground.

In accordance with another aspect of the present disclosure, a method is provided that includes attenuating signal strength of an amplitude shift keying (ASK) carrier signal detected at a wireless power transmitter of a wireless charging system, and generating an attenuated signal that is within a predetermined signal strength range. The ASK carrier signal is sent by a wireless power receiver of the wireless charging system. The method further includes detecting peak values of the attenuated signal, and generating a zero-crossing signal representing zero-crossing points of the attenuated signal at a carrier frequency of the ASK carrier signal. The method also includes generating, based on the peak values of the attenuated signal and the zero-crossing signal, a demodulated ASK signal from the ASK carrier signal.

Aspects of the present disclosure have advantages of enhancing quality of ASK modulation and demodulation in the wireless charging system, enabling adaptive adjustment of ASK modulation depth under various operation conditions, and allowing for direct demodulation of an ASK signal at a wireless charging operation frequency.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless other-

DETAILED DESCRIPTION OF ILLUSTRATIVE EMBODIMENTS

Figure 1:
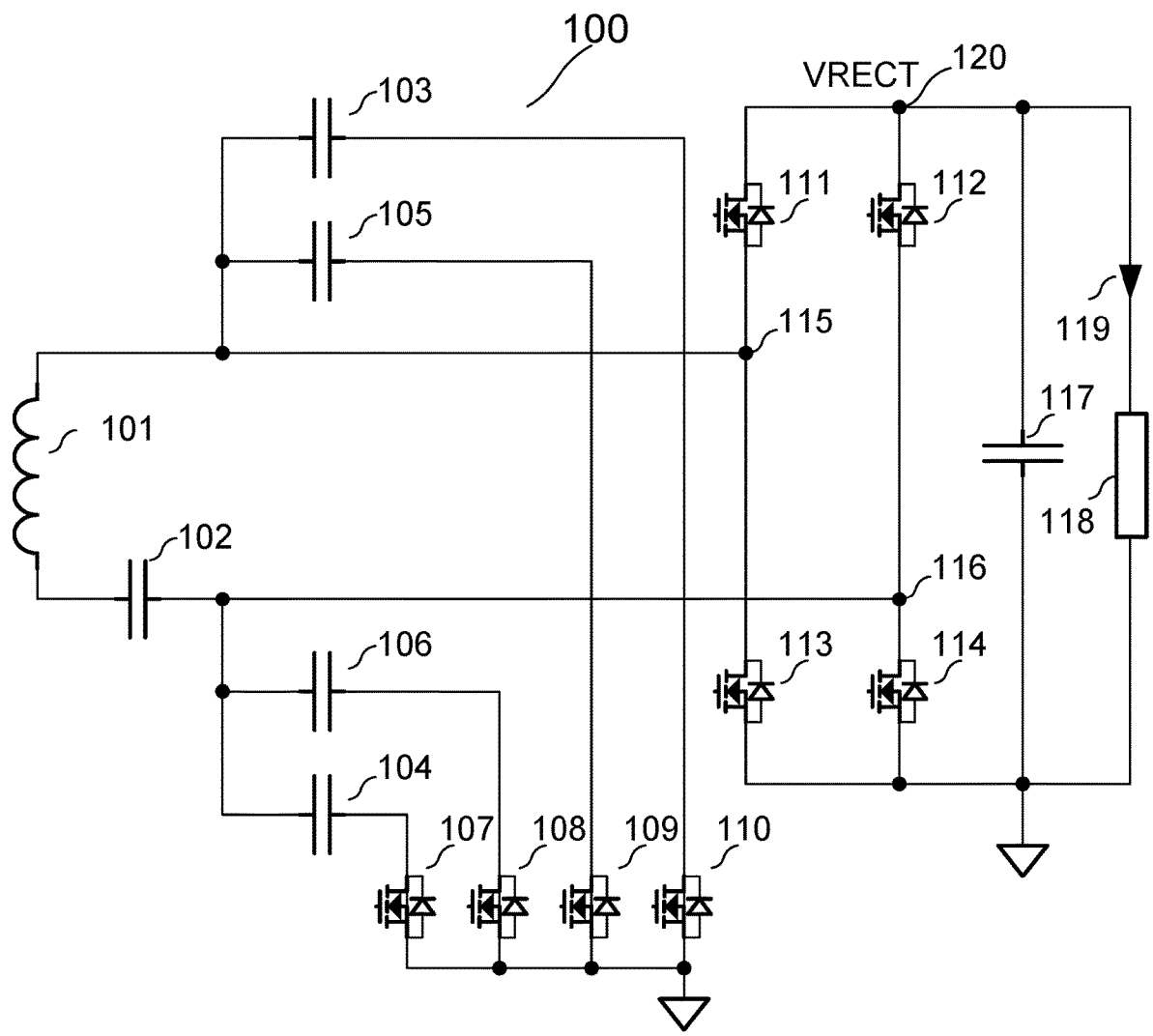
FIG. 1 is a diagram of an example conventional circuit for ASK modulation in a wireless charging system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In a charging system providing wireless battery charging for electronic devices, such as smartphones, tablets, and wearable devices, a wireless power transmitter (Tx) is configured for providing energy or power for wirelessly charging a device. The energy or power may be transmitted from the wireless power transmitter for wireless charging in a form of magnetic field (or inductive coupling), and a wireless power receiver (Rx) (i.e., the device receiving the magnetic energy) receives and converts the magnetic field energy into electrical energy to charge a battery or power up a system. In the present disclosure, the wireless power transmitter and the wireless power receiver may be referred to as wireless power Tx (or simply Tx) and wireless power Rx (or simply Rx), respectively, for illustration simplicity. There is no electrical connection between the Tx and Rx. According to Wireless Power Consortium (WPC) (which is also referred to as Qi) standard, inductive coupling between two magnetic coils is used to transfer power from the Tx to the Rx. In the wireless charging system, feedback needs to be provided between the Rx and Tx in order to control the amount of energy being transmitted by the Tx to charge the battery or power up the system safely at the Rx. In this way, the Rx communicates with the Tx, and indicates whether more or less power is needed for charging. In this case, the Rx is responsible for communications of its power requirements, and the Tx is a "listener" listening to the power requirements of the Rx. For WPC based wireless charging systems, a feedback loop is accomplished through an ASK (Amplitude Shift Keying) method. The ASK method includes two parts: ASK modulation at the Rx side and ASK demodulation at the Tx side. At the Rx side, a control message is coded in an ASK signal first. Then the ASK signal modulates the amplitude of a high frequency carrier (e.g., a power transfer signal having a frequency that is generally equal or greater than 100 KHz)) with the low frequency ASK signal (e.g., at a rate around a few kb/s), to generate an amplitude modulated ASK signal (which is also referred to as an ASK carrier signal, or modulated ASK signal). The ASK carrier signal may be communicated (by inductive coupling) to the Tx side. At the Tx side, the ASK carrier signal is demodulated to obtain the original ASK signal. The ASK signal is then decoded to obtain the control message. The Tx will then function accordingly based on the control message.

FIG. 1 is a diagram of an example conventional circuit 100 for ASK modulation in a wireless charging system. FIG. 1 shows the ASK method recommended by WPC to achieve ASK modulation. The circuit 100 is at the Rx side of the wireless charging system. The circuit 100 includes a Rx coil 101, a Rx resonant capacitor 102, ASK modulation capacitors 103, 104, 105, 106, power metal-oxide-semiconductor field-effect transistor (MOSFET) switches (or switches) 107, 108, 109 and no, sync rectifying power MOSFEs (or switches) 111, 112, 113 and 114, an output filter (or filtering) capacitor 117, and a system load 118. The Rx coil 101 and resonant capacitor 102 form a Rx side resonant circuit (which is also referred to as a Rx resonant circuit, or a resonant circuit unless clarification is needed). The Rx side resonant circuit and the switches 111, 112, 113 and 114 form the basic wireless power receiver that receives magnetic field energy from the wireless power transmitter, and converts the energy into electrical energy for charging. The voltage VRECT at an output node 120 of the wireless power receiver is the output voltage of the wireless power receiver. A system load current 119 flows from the output node 120 through the system load 118. The switches 107, 108, 109 and no enable the ASK modulation capacitors 103, 104, 105 and 106 to be connected to (or referred to as switched into) or disconnected from the Rx side resonant circuit. In this scheme, the ASK modulation capacitors 103 and 104 form one pair, and the ASK modulation capacitors 105 and 106 form another pair. The ASK modulation capacitors are always switched into the resonant circuit in pair. For example, the switches 107 and no are both turned on to connect the capacitor pair 103/104 into the resonant circuit, or the switches 108 and 109 are both turned on to connect the capacitor pair 105/106 into the resonant circuit. There are three ASK modulation modes: capacitor pair 103/104 only, capacitor pair 105/106 only, and both capacitor pairs 103/104 and 105/106 are used to control the ASK modulation depth at the Rx side.

Figure 2:
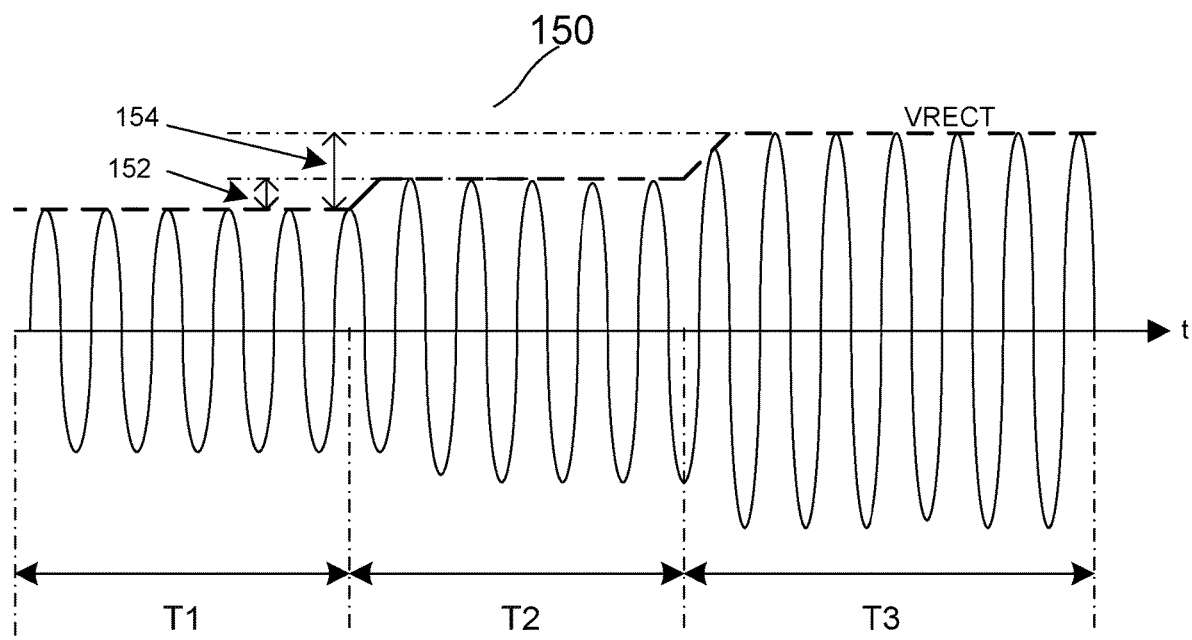
FIG. 2 is a diagram illustrating an example voltage waveform of a resonant capacitor in FIG. 1.

FIG. 2 is a diagram illustrating an example voltage waveform 150 of the resonant capacitor 102 in FIG. 1 with ASK modulation. This voltage waveform 150 reflects the ASK carrier signal having an amplitude modulated by the ASK signal as described above. The modulated ASK signal may be communicated (by inductive coupling) to the Tx side as a feedback signal. FIG. 2 shows a time interval T1 during which no ASK modulation is performed, a time interval T2 during which the capacitor pair 103/104 is switched in (i.e., connected to the Rx resonant circuit), and a time interval T3 during which the capacitor pair 105/106 is switched in. FIG. 2 also shows the ASK modulation depth 152 during the time interval T2 and the ASK modulation depth 154 during the time interval T3. The ASK modulation depth in FIG. 2 may be controlled by (1) capacitance of the capacitors 103, 104, 105 and 106; and (2) the number of the capacitor pairs that are switched in. The value (capacitance) of the capacitor 103 needs to be equal to that of the capacitor 104, and similarly, the capacitance of the capacitors 105 and 106 need to be the same. This means that three modulation depths in total can be achieved by the ASK modulation circuit 100 provided in FIG. 1 under various operation conditions (i.e., for different output voltages VRECT and system load currents).

Figure 3:
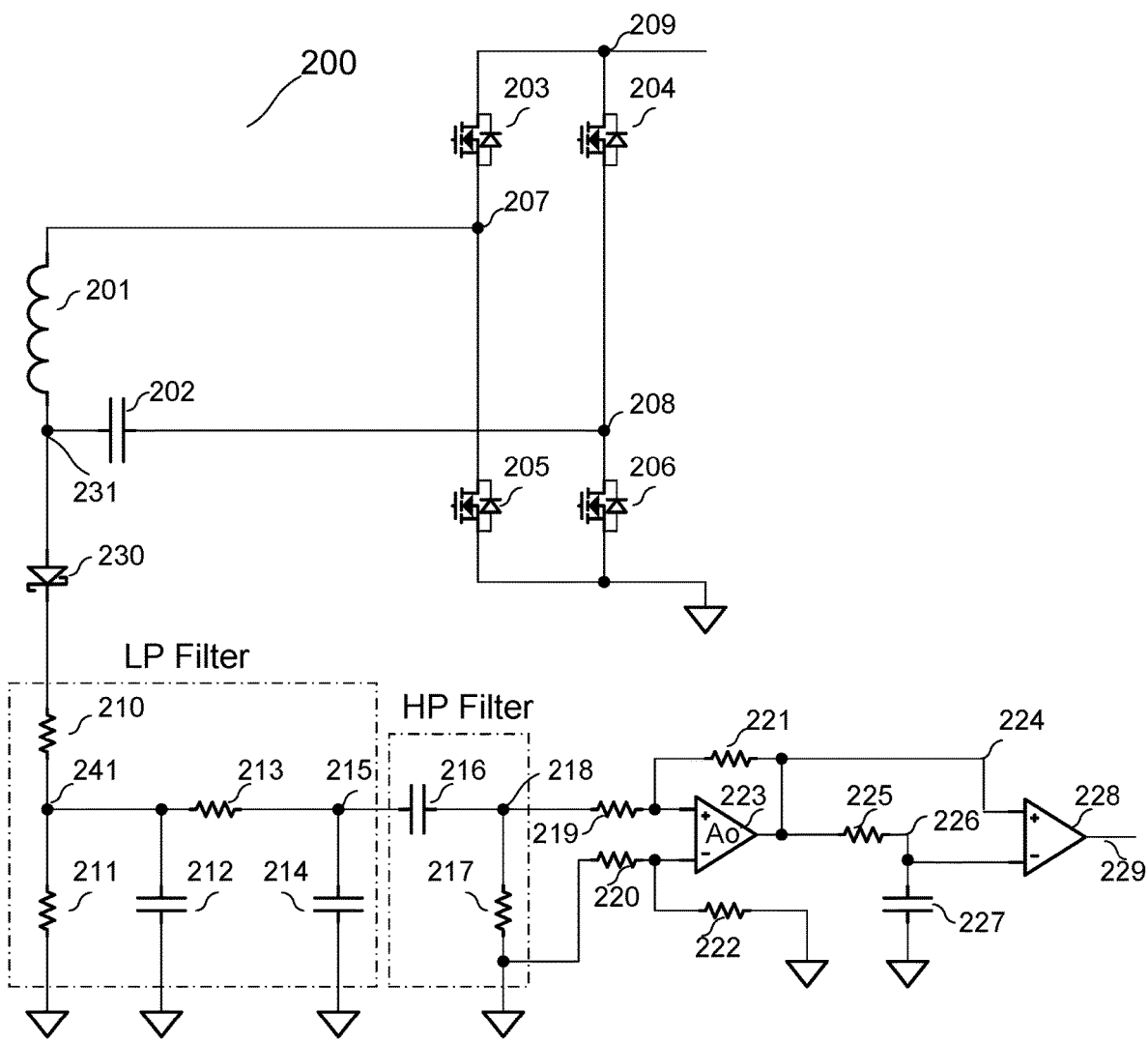
FIG. 3 is a diagram of an example conventional circuit for ASK demodulation in a wireless charging system.

On the Tx side, the ASK carrier signal communicated from the Rx side needs to be demodulated. FIG. 3 is a diagram of an example conventional circuit 200 for ASK demodulation in a wireless charging system. FIG. 3 shows the ASK demodulation scheme recommended by the WPC standard. The circuit 200 may be used to demodulate the ASK carrier signal as illustrated in FIG. 1 and FIG. 2. The circuit 200 in FIG. 3 includes a Tx resonant circuit including a Tx coil 201 and a Tx resonant capacitor 202, a full-bridge switch network including switches 203, 204, 205 and 206, a rectifier diode 230, a resistor divider including resistors 210 and 211, a two stage low-pass filter including capacitors 212, 214 and resistors 210, 211, 213, a high-pass filter including a capacitor 216 and a resistor 217, a differential amplifier including four resistors 219, 220, 221, 222 and an op-amp 223, a second low-pass filter including a resistor 225 and a capacitor 227, and a comparator 228. The two stage low-pass filter and the high-pass filter form a band pass filter that allows signals with frequency around 2 kHz to pass through. The Tx resonant circuit and the full-bridge switch form the basic wireless power transmitter in the wireless charging system. The rest of the components of FIG. 3 form an ASK demodulation circuit that is configured to demodulate the ASK carrier signal, which is reflected by the voltage at the node 231.

Figure 4:
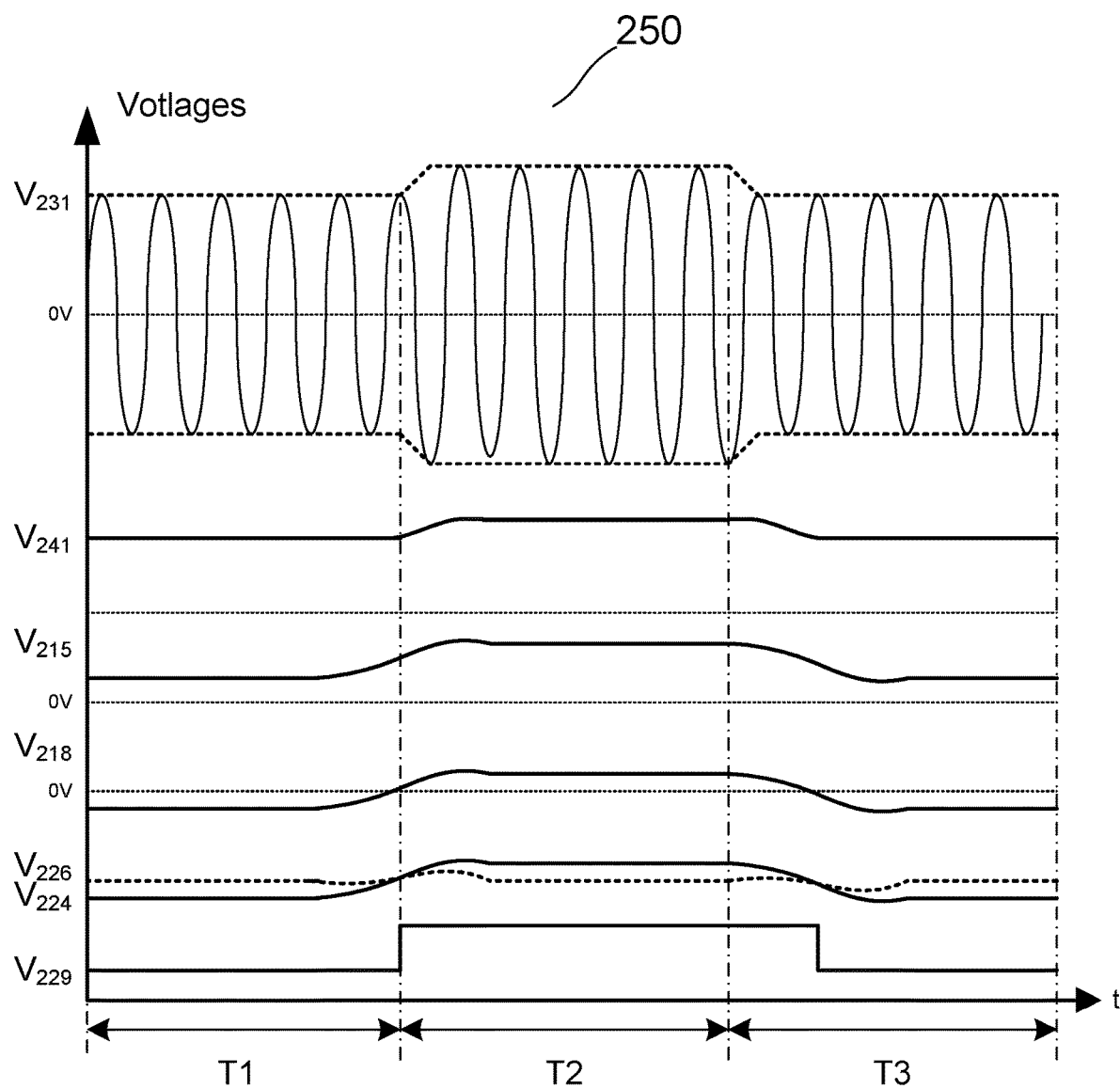
FIG. 4 is a diagram illustrating example waveforms of the circuit in FIG. 3.

FIG. 4 is a diagram illustrating example waveforms 250 of the circuit 200 in FIG. 3, which shows operations of the ASK demodulation circuit in FIG. 3. FIG. 4 shows respective waveforms of voltages at nodes 231, 241, 215, 218, 224, 226, and 229 in FIG. 3. The voltage ($V_{231}$) at the node 231 is a high frequency alternating current (AC) voltage with an ASK signal modulated amplitude. The diode 230 rectifies the high frequency AC voltage (also referred to as an AC signal) at the node 231 and converts it into a pulse direct current (DC) signal. Then the pulse DC signal is attenuated by the resistor divider (including resistors 210 and 211) to achieve a desired voltage level before demodulation, resulting in an attenuated signal, i.e., the voltage $V_{241}$ at the node 241. As shown in this example, the diode 230 removes (filters out) the negative values of the AC signal. The first low-pass filter removes the rectified high frequency carrier from the attenuated signal (resulting in the voltage $V_{215}$ at the node 215). The voltage $V_{218}$ at the node 218 is the envelope of the high frequency AC voltage at the node 231. Note that the voltage at the node 215 ($V_{215}$) includes both the ASK signal and a DC value. After the high pass filter, the voltage at node 218 ($V_{218}$) includes the ASK signal only. The voltage (the ASK signal) is amplified by the differential amplifier, which generates an output voltage ($V_{224}$). The output voltage $V_{224}$ is directly fed into the non-inverting input of the comparator 228. The inverting input of the comparator 228 is fed with a signal $V_{226}$, which is the amplified ASK modulation signal after passing through the second low-path filter formed by the resistor 225 and the capacitor 227. The voltage at the node 226 is almost a DC voltage. The output voltage ($V_{229}$) of the comparator 228 is the ASK signal demodulated from the modulated ASK carrier signal $V_{231}$.

Although the WPC recommended ASK modulation and demodulation methods as illustrated above work properly in general, it has been noticed that under some operating conditions (e.g., for certain output voltages VRECT and system load currents), the conventional ASK modulation and demodulation methods do not function properly, causing wireless charging disconnection issues. Some reasons for these issues may include: (1) there are only three options to control the modulation depth (only three modulation modes/depths available), (2) the modulation depth is not monitored, therefore there is no modulation depth based modulation quality control, (3) the low-pass and high-pass filters degrade the demodulated ASK signal quality, and (4) the comparator introduces errors in decoding timing due to variations of filtered signals, which are used as references for generating the demodulated ASK signal, e.g., $V_{229}$ in FIG. 4.

It would be desirable to develop ASK modulation and demodulation methods that can (1) provide more ASK modulation depth options and types, (2) monitor ASK modulation depth such that, by using different ASK modulation depth options, the ASK modulation depth can be kept relatively constant under all Rx output voltage and current conditions, (3) operate without the need to use low/high-pass filters, and (4) directly demodulate ASK carrier signals without using the heavily filtered ASK modulation signals as references at the demodulation comparator.

Embodiments of the present disclosure may be applied, but not limited, to wireless charging systems based on the Wireless Charging Consortium (WPC) standard or Qi standard. Embodiments of the present disclosure enhance the ASK modulation and demodulation quality by adaptively adjusting ASK modulation depth under various operation conditions of a wireless power Rx, and by directly demodulating a ASK carrier signal at a wireless charging operation frequency. Embodiment ASK demodulation methods eliminate various passive components used to form a bandpass filter that is required in the conventional demodulation method proposed by the WPC standard.

Figure 5:
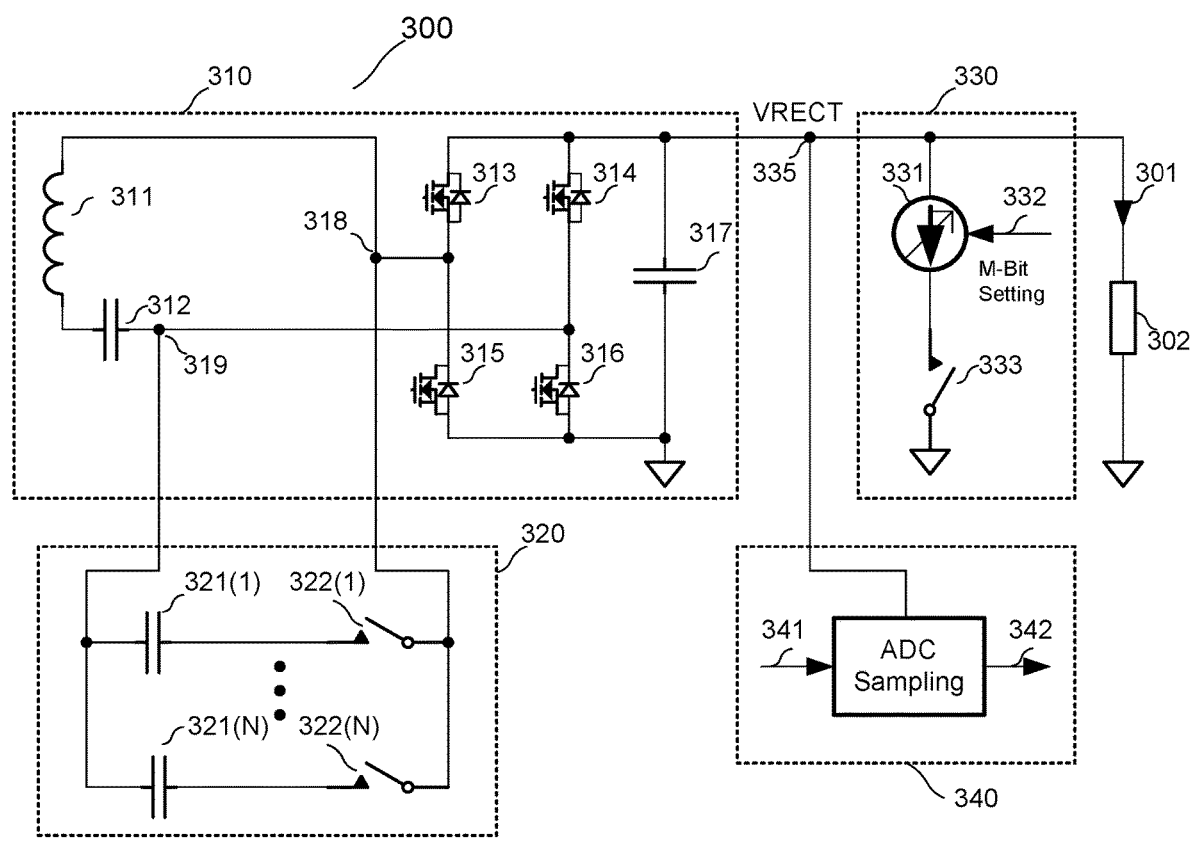
FIG. 5 is a diagram of an example circuit for ASK modulation in a wireless charging system according to an embodiment of the present disclosure.

FIG. 5 is a diagram of an example circuit 300 for ASK modulation in a wireless charging system according to an embodiment of the present disclosure. The circuit 300 includes four blocks (or referred to as circuit blocks), i.e., a wireless receiver resonant and rectifier block 310 (which is the wireless power Rx in the wireless charging system), a capacitive ASK modulation block 320, a resistive ASK modulation block 330, and a VRECT voltage sampling block 340. The wireless receiver resonant and rectifier block 310 includes a Rx coil 311 (or simply referred to as coil 311), a Rx resonant capacitor 312 (or simply referred to as resonant capacitor 312), four sync rectifier switches 313-316, and an output filtering capacitor 317. The Rx coil 311 and the Rx resonant capacitor 312 form a Rx resonant circuit. The wireless receiver resonant and rectifier block 310 is configured to fulfill the purpose of receiving the power transmitted by a wireless power transmitter. The output of the block 310 is a DC voltage VRECT at an output node 335 of the wireless receiver resonant and rectifier block 310. A system load 302 is connected between the output node 335 and the ground, with a system load current flowing through the system load 302. The resonant inductor current 301 flowing through the Rx coil 311 and the voltage across the resonant capacitor 312 are quasi-sine waves, and the operation frequency of the wireless receiver resonant and rectifier block 310 is from 85 kHz to 205 kHz based on the WPC standard. The resonant inductor current of the Rx coil 311 is rectified by the sync rectifier switches 313, 314, 315 and 316, and the DC voltage (VRECT) across the output filtering capacitor 317 is generated. During ASK communication period (i.e., during a period when the Rx provides feedback to the Tx to indicate whether more or less power is needed by the Rx for charging), the VRECT voltage level fluctuates due to ASK modulation.

Figure 13:
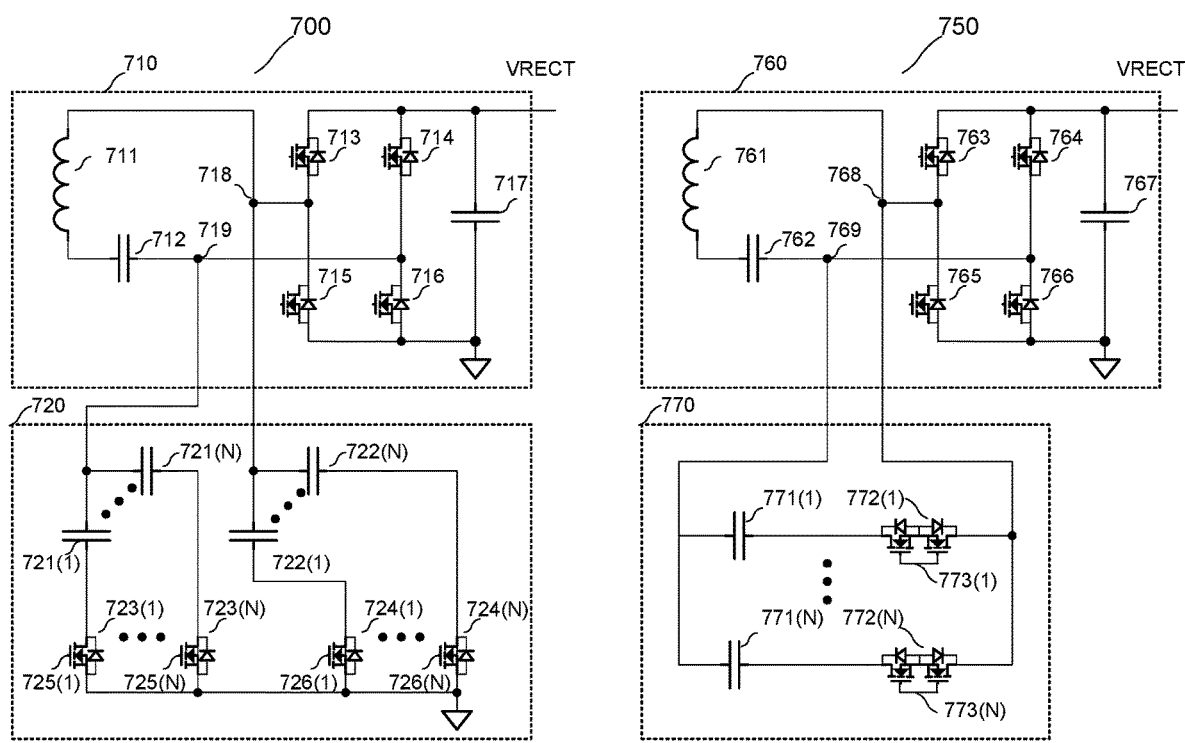
FIG. 13 are diagrams of example circuits for ASK modulation in a wireless charging system according to embodiments of the present disclosure.

The capacitive ASK modulation block 320 includes a group of sub-circuits connected between a switching node 319 and a switching node 318. The group of sub-circuits may include N sub-circuits, each of which includes an ASK modulation capacitor (or simply referred to as capacitor) and a switch connected in series between the switching node 319 and the switching node 318, e.g., a sub-circuit includes a capacitor 321(1) and a switch 322(1) connected in series, another sub-circuit includes a capacitor 321(N) and a switch 322(N) connected in series. N is an integer greater than zero. In one embodiment, the switches 322(1), 322(2), . . . 322(N) may be implemented by back-to-back connected power MOSFETs. In another embodiment, each of the switches 322(1), 322(2), . . . 322(N) may be implemented by two back to back connected power MOSFETs, and the common node of the two back to back connected power MOSFET is connected to the ground. In this embodiment, the ASK modulation capacitor includes two capacitors connected to the switching nodes 318 and 319 respectively. FIG. 13 is a diagram of an embodiment circuit 700 illustrating this embodiment. FIG. 13 will be described later in this disclosure.

The capacitive ASK modulation block 320 is configured to achieve amplitude modulation of the power transfer signal by switching in and out the ASK modulation capacitors 321(1), 321(2), . . . , 321(N). This amplitude modulation method may be referred as capacitive amplitude modulation and involves no power dissipation. One or more sub-circuits may be connected to the resonant circuit by turning on the corresponding switch(es) of the sub-circuit(s), such that one or more of these capacitors are electronically connected to the Rx resonant circuit. Control signals may be provided to control to switch on or off the switches 322(1), . . . , 322(N), respectively, which consequently switches in or out their corresponding ASK modulation capacitors.

By turning on a switch, a corresponding capacitor is connected to the Rx resonant circuit. Thus, the natural resonant frequency of the Rx resonant circuit changes, resulting in a variation in both the resonant current flowing through the Rx coil 311 and the voltage across the resonant capacitor 312 (which is generally referred to as a variation in the following description). The magnitude of the variation depends on how much ASK modulation capacitance being switched in the resonant circuit. In general, the more ASK modulation capacitors are switched in, the larger the variation. The variation may also depend on the operation frequency of the wireless power Rx. In general, with the same amount of ASK modulation capacitance, the lower the operation frequency, the higher the variation, and the higher the operation frequency, the lower the variation. Therefore, at a high operation (switching) frequency (e.g., close or equal to 205 kHz in a WPC based system), the effectiveness of the capacitive ASK modulation diminishes. In this case, resistive ASK modulation may be used to provide a good ASK modulation quality.

The resistive ASK modulation block 330 includes a programmable current sink 331 and a switch 333 connected in series between the output node 335 and the ground. The resistive ASK modulation block 330 is configured to achieve amplitude modulation of the power transfer signal by switching in and out the programmable current sink 331, i.e., by connecting the programmable current sink 331 to or disconnecting the programmable current sink 331 from the output node 335 by switching on or off the switch 333. The programmable current sink 331 has M-bit programmability, and may be programmed by a control signal 332, where M is integer. This amplitude modulation method may be referred as resistive amplitude modulation and involves power dissipation when the switch 333 is turned on. A control signal may be provided to control to turn on or off the switch 333.

The VRECT value is a function of the output loading (system load) of the wireless power Rx 310 if VRECT regulation is disabled. With VRECT regulation disabled, the higher the output loading, the lower the VRECT value, resulting in lower resonant current and voltage in the Rx resonant circuit. This is effectively equivalent to amplitude modulation. Therefore, resistive loading can be used to achieve ASK modulation. It should be noted that power dissipation is involved in the resistive ASK modulation. Extra care is needed, especially when the current sink 331 is built inside the Rx integrate circuit (IC). It is recommended to use resistive ASK modulation method at light output loading conditions. The resistive ASK modulation is enabled when the switch 333 is turned on.

In this example, the ASK modulation at the Rx side may be implemented by use of the capacitive ASK modulation, the resistive ASK modulation, or both. As an example, when the operation frequency of the wireless power receiver is less than a first predetermined frequency threshold, the capacitive ASK modulation may be used. As another example, when the operation frequency of the wireless power receiver is greater than a second predetermined frequency threshold, the resistive ASK modulation may be used. As yet another example, when the operation frequency of the wireless power receiver is within a predetermined frequency range, both the capacitive and the resistive ASK modulations may be used. Control signals may be generated to control to enable one of or both ASK modulations to operate.

The VRECT voltage sampling block 340 includes a ADC sampling module/circuit, and is configured to sample the voltage VRECT at the node 335. The value of the voltage VRECT reflects the amplitude of the modulated ASK signals. The sampled VRECT voltage may be monitored and used to regulate the ASK modulation depth to a desired value, so as to adaptively control the ASK modulation quality. A control signal 341 may be fed to the ADC sampling module/circuit to control sampling of the VRECT voltage. The output 342 is a sampled VRECT voltage.

Figure 6:
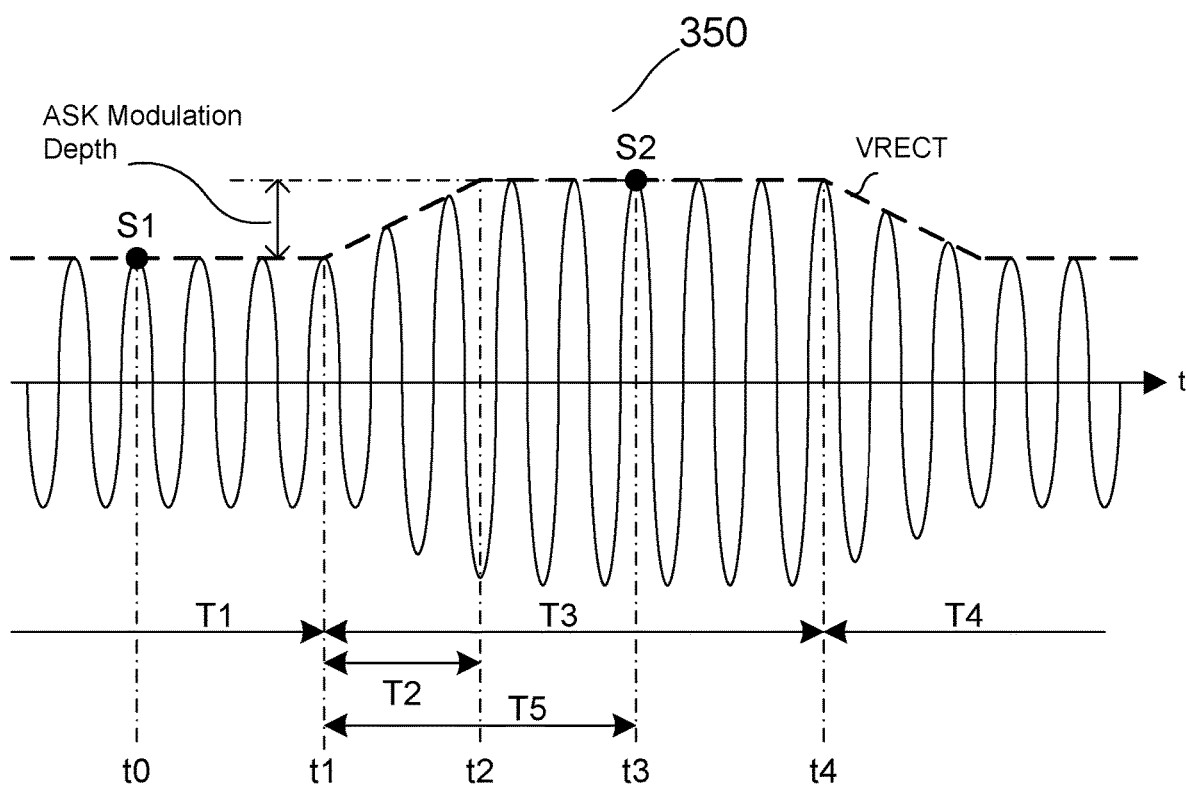
FIG. 6 is a diagram of an example voltage waveform of a resonant capacitor in FIG. 5.

FIG. 6 is a diagram of an example waveform 350 of the voltage across the capacitor 312 in FIG. 5. FIG. 6 illustrates example timing relationships when the ASK modulation in FIG. 5 starts and ends. In FIG. 6, the VRECT value (si) without ASK modulation is sampled at time to. The ASK modulation starts at t1 and ends at t4 (time interval T3). When the ASK modulation starts, it may take some time for the ASK modulation to become stable and the voltage VRECT reaches a stable value, and this period of time is represented by a time interval T2. After T2, i.e., starting from time t2, the VRECT value can be sampled. For example, the VRECT value is sampled at time t3. A time interval T5 represents the time delay from t1 to a VRECT sampling time (t3), and this time delay ensures that a stable VRECT value during the ASK modulation is sampled. T1 and T4 represent time intervals with no ASK modulation.

Figure 7:
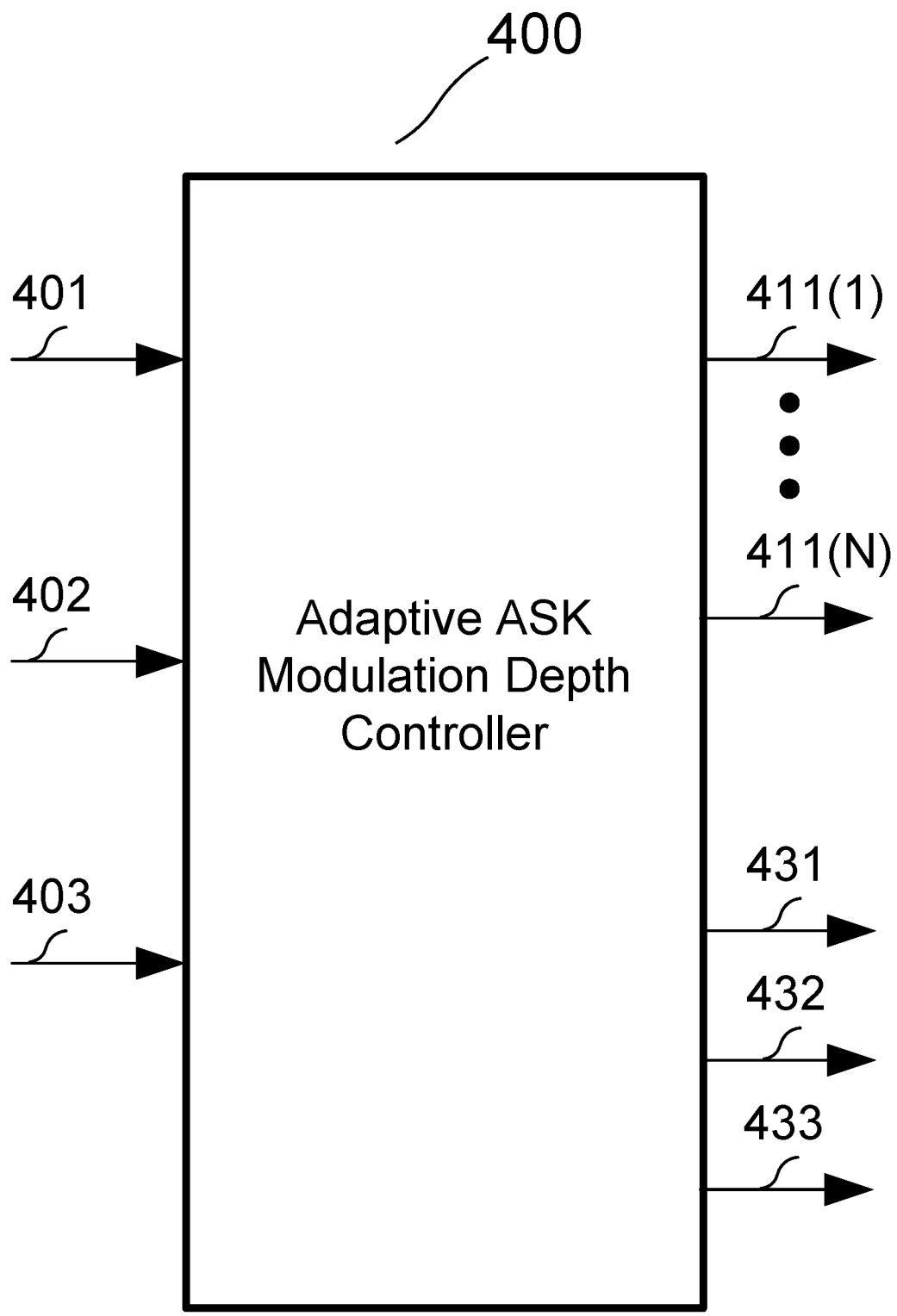
FIG. 7 is a diagram of an example system configured to control ASK modulation at a wireless power receiver according to an embodiment of the present disclosure.

FIG. 7 is a diagram of an example system 400 configured to control ASK modulation at a wireless power Rx according to an embodiment of the present disclosure. The system 400 includes an adaptive ASK modulation depth controller, which receives one or more input signals, and generates one or more output signals that may be used to control ASK modulation, e.g., ASK modulation depth. As an example, this system 400 may be applied to the circuit 300 to control the capacitive ASK modulation block 320 and the resistive ASK modulation block 330 to achieve a desired ASK modulation depth at the Rx side. In some embodiments, the inputs of the system 400 may include sampled values of a VRECT voltage 401, a Rx operation frequency 402, and an output current 403 (i.e., the system load current 301 in FIG. 5). The outputs of the system 400 may include driving signals 411(1), . . . , 411(N) and control signals 431, 432 and 433. The driving signals 411(1), . . . , 411(N), may be used as the control signals to control to switch on or off switches 322(1) to 322(N) in FIG. 5, respectively. The control signal 431 may be used to set the value of the current sink 331 in FIG. 5. The control signal 432 may be used to turn on or off the switch 333 in FIG. 5. In addition, the control signal 433 may be used to generate a message, which may be sent to the wireless power Tx via an ASK signal or using other applicable communication methods, such as Bluetooth, to inform the wireless power Tx to weight more on a current ASK demodulation output for better ASK communication quality. The message may indicate, to the wireless power Tx side, an ASK modulation quality at the wireless power Rx.

Figure 8:
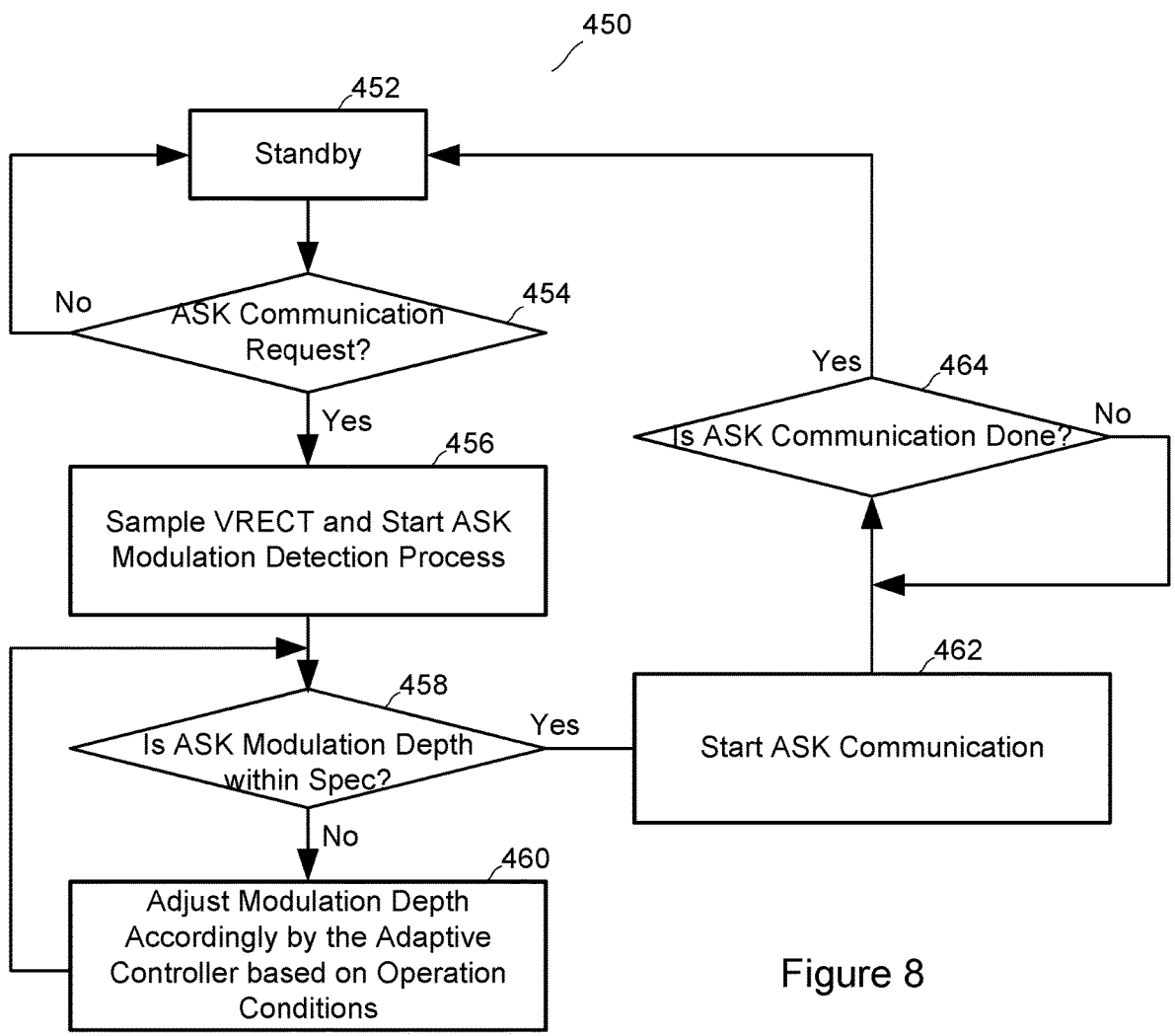
FIG. 8 is a flow diagram of an example method for ASK modulation control according to an embodiment of the present disclosure.

FIG. 8 is a flow diagram of an example method 450 for controlling ASK modulation depth according to an embodiment of the present disclosure. The method 450 dynamically adjusts the ASK modulation depth based on monitored VRECT values, and enable to control the ASK modulation depth within a desired range. The method 450 represents an example embodiment algorithm that may be used in the system 400 of FIG. 7 to generate the output signals. The method 450 may be implemented by a program through a microcontroller (MCU) (Firmware) or a state-machine (Hardware). An electronic device, such as a smart phone, may be configured to include a wireless power Rx circuit (e.g., the circuit 300 in FIG. 5) and a MCU (or a state-machine), which executes a program to perform the method 450. The method 450 will be described using the MCU as an example. The method 450 starts with a standby state (block 452), i.e., no ASK modulation starts and the MCU does not perform any ASK modulation depth control. The MCU detects whether ASK communication request is received (block 454). The ASK communication request may be received when the wireless power Rx wants to perform ASK communication with the wireless power Tx. When no ASK communication request is detected, the method 450 goes back to block 452, where the MCU remains in the standby state.

When the ASK communication request is received, the MCU controls to sample the VRECT voltage and start an ASK modulation depth detection process (block 456). A VRECT value may be sampled first (e.g., at time to in FIG. 6), and then the ASK modulation depth detection process is started. During the process, the ASK modulation at the wireless power Rx is enabled with a default setting. The setting is an ASK modulation setting at the wireless power Rx side, and may include settings of the switches 323(1), . . . , 323(N), the programmable current sink 331, and/or the switch 333. The default setting may be predetermined, or may be an ASK modulation setting that was previously used at the wireless power Rx. The ASK modulation is performed using the default setting at this stage. Then the VRECT voltage is sampled again after a delay time, e.g., T5 in FIG. 6. The sampled VRECT value is then compared with a predetermined threshold to obtain a difference (i.e., an ASK modulation depth) between the sampled VRECT value and the threshold. The MCU determines whether the ASK modulation depth is within a specification (e.g., within a desired ASM modulation depth range, or a threshold range) (block 458). When the ASK modulation depth is within the desired ASM modulation depth range, the MCU starts the ASK communication with the default ASK modulation setting (block 462).

When the ASK modulation depth is outside the desired ASK modulation depth range, the MCU may adjust the ASK modulation setting (the default setting used) based on the operation frequency or the wireless power Rx and/or the output loading conditions, in order to achieve the desired ASK modulation depth (block 460). The adjusted ASK modulation setting may be saved as a new or updated ASK modulation setting. The MCU may generate control signals, e.g., based on the operation frequency, the VRECT, and/or the system load current of the wireless power Rx, as described with respect to the system 400, to adjust, e.g., to turn on or off one or more switches 323(1), . . . , 323(N), and 333 in FIG. 5. The adjustment may be an iterative process, where the MCU controls to adjust the ASK modulation setting, sample the VRECT value, and go through the steps in blocks 458 and 460. When the ASK modulation depth obtained with the adjusted ASK modulation setting is within the desired ASM modulation depth range, the MCU proceeds to block 462. If the desired ASK modulation depth cannot be achieved after a number of iterations, a best ASK modulation setting that has been achieved may be saved and the ASK communication is started using this ASK modulation setting. In this case, the MCU may control the wireless power Rx to send a message to the wireless power Tx, informing the poor resonant capacitor voltage ASK modulation quality. When receiving the message, the wireless power Tx may determine to weight more on the output of the current ASK modulation. The MCU may keep monitoring the ASK communication after started, and determine whether the ASK communication is over (block 464). When the ASK communication is over, the MCU returns to the standby state.

While the embodiment method 450 is described with respect to the circuit 300 of FIG. 5, those of ordinary skill in the art would recognize that the embodiment method 450 is applicable to other circuits for ASK modulation depth control without departing from the spirit and principle of the present disclosure. As an example, a circuit that provides multiple controllable capacitances between the nodes 318 and 319 in FIG. 5 may be used for capacitive ASK modulation of the wireless power Rx, and the embodiment method 450 is applicable for controlling the ASK modulation depth. As another example, a circuit that provides controllable currents flowing from the VRECT node in FIG. 5 to the circuit may be used for resistive ASK modulation of the wireless power Rx, and the embodiment method 450 is applicable for controlling the ASK modulation depth.

Figure 9:
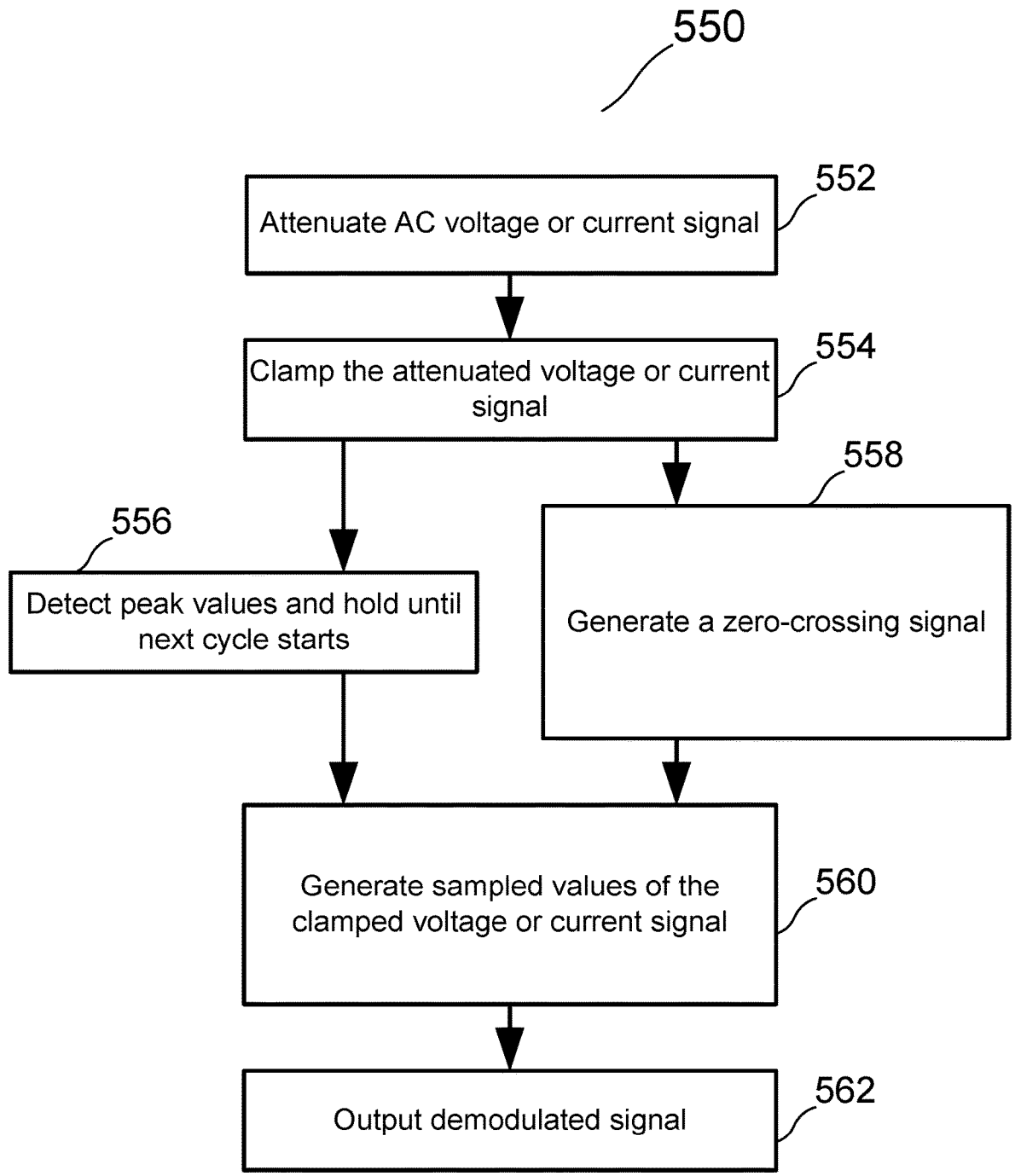
FIG. 9 is a flow diagram of an example method for ASK demodulation according to an embodiment of the present disclosure.

FIG. 9 is a flow diagram of an example method 550 for ASK demodulation according to an embodiment of the present disclosure. The method 550 may be implemented by a program through a microcontroller (MCU) (Firmware) or a state-machine (Hardware). A charging device may include a wireless power Tx circuit (e.g., the circuit 600 in FIG. 12) and a MCU (or a state-machine), which executes a program to perform the method 550. The method 550 is indicative of operations occurring at the wireless power Tx. The input (referred to as an AC signal in the following description) of the ASK demodulation method is an ASK carrier signal, which may be the current flowing through the Tx coil at the wireless power Tx or the voltage across the Tx resonant capacitor at the wireless power Tx, both of which are high frequency AC signals. The AC signal may be a modulated ASK signal communicated by a wireless power Rx to the wireless power Tx by inductive coupling. If the input is the AC current flowing through the Tx coil, the AC current needs to be converted into a voltage signal first, e.g., through a sense resistor. In general, the ASK demodulation method 550 in FIG. 9 may include four blocks/steps: (1) an attenuation block; (2) a clamp block; (3) a peak value detection and zero-crossing detection bock; and (4) a sample and hold block.

The ASK demodulation method 550 is described as follows. The AC signal is attenuated (block 552). The signal strength of the AC signal may be attenuated to a predetermined signal strength or within a predetermined signal strength range. The attenuated AC signal may then be clamped (block 554). The attenuated AC signal may pass through the clamp block to obtain a clamped AC signal, where, e.g., only the positive portion or the negative portion of the attenuated AC signal is kept. The attenuated AC signal may be clamped into a predetermined voltage or current range, e.g., [−1v, 5v], or any other applicable range. The blocks 552 and 554 may be combined into one block. The clamped AC signal may then be fed to the peak and zero-crossing detection block to detect peak values of the clamped AC signal (block 556) and to generate a zero-crossing signal of the clamped AC signal (block 558). The peak values of the clamped AC signal may be detected and be held until next cycle starts. The zero-crossing points may be detected, and an appropriate output signal may be used to represent the zero-crossing points. For example a square wave signal may be used, with rising and falling edges corresponding to zero-crossing points.

Both peak values and the zero-crossing signal may be fed to the sample and hold block to generate sampled values of the AC signal (block 560). The zero-crossing signal may be used to control the reset and sample times of the sample and hold block. As an example, the zero-crossing signal may be represented by a square-wave signal with the rising and falling edges representing the zero-crossing times/points of the clamped signal. The rising edge of the square wave signal represents zero-crossing from negative to positive, and the falling edge of the square wave signal represents zero-crossing from positive and negative. In an example case where the positive portion of the AC signal is kept in block 554, the rising edge of the square wave signal may be used to reset the sample and hold block, and the falling edge of the square wave signal may be used to sample and hold a peak value. The output of the sample and hold block represents the demodulated ASK signal. The demodulated ASK signal is then output (block 562). The ASK demodulation method thus demodulates the modulated ASK signal that is at the AC frequency without the need of a bandpass filter, avoiding the distortion in the demodulated ASK signal that is introduced by the bandpass filter as well as the passive components that form the bandpass filter.

Figure 10:
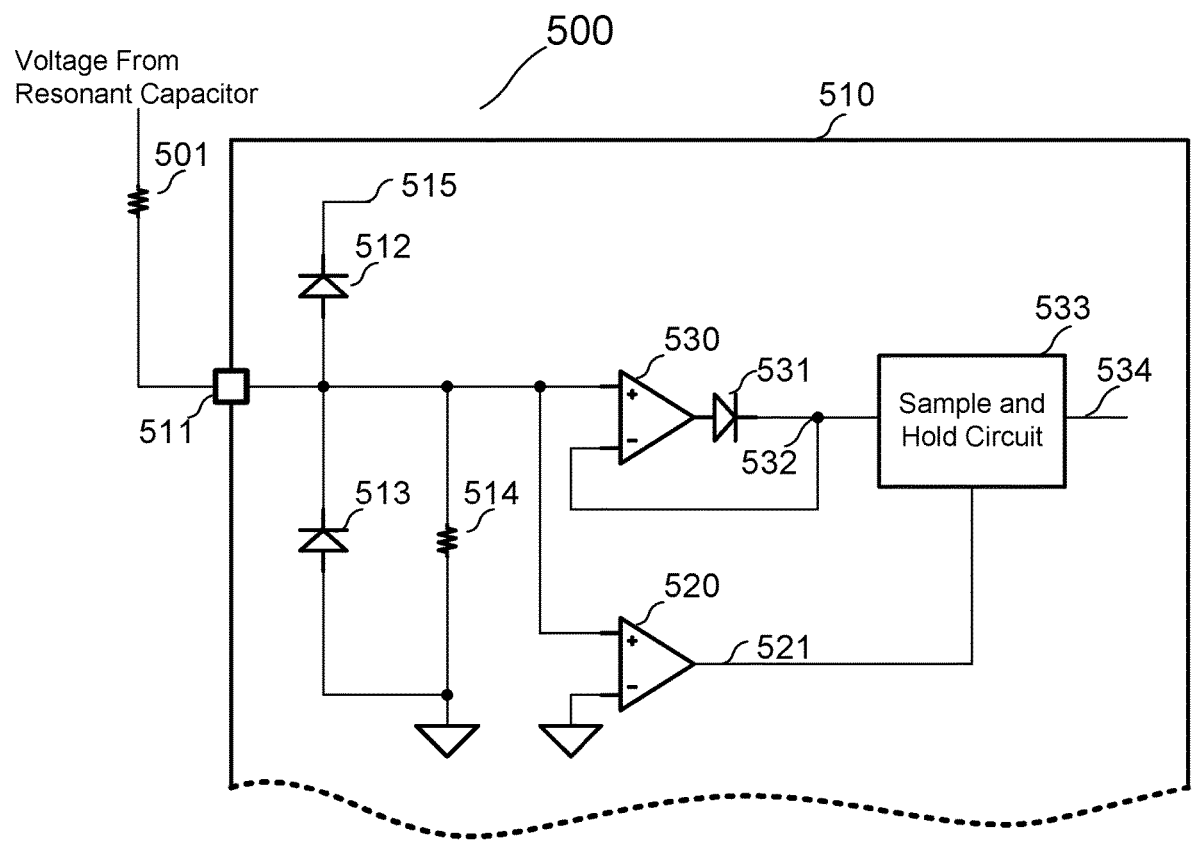
FIG. 10 is a diagram of an example circuit for ASK demodulation according to an embodiment of the present disclosure.
Figure 11:
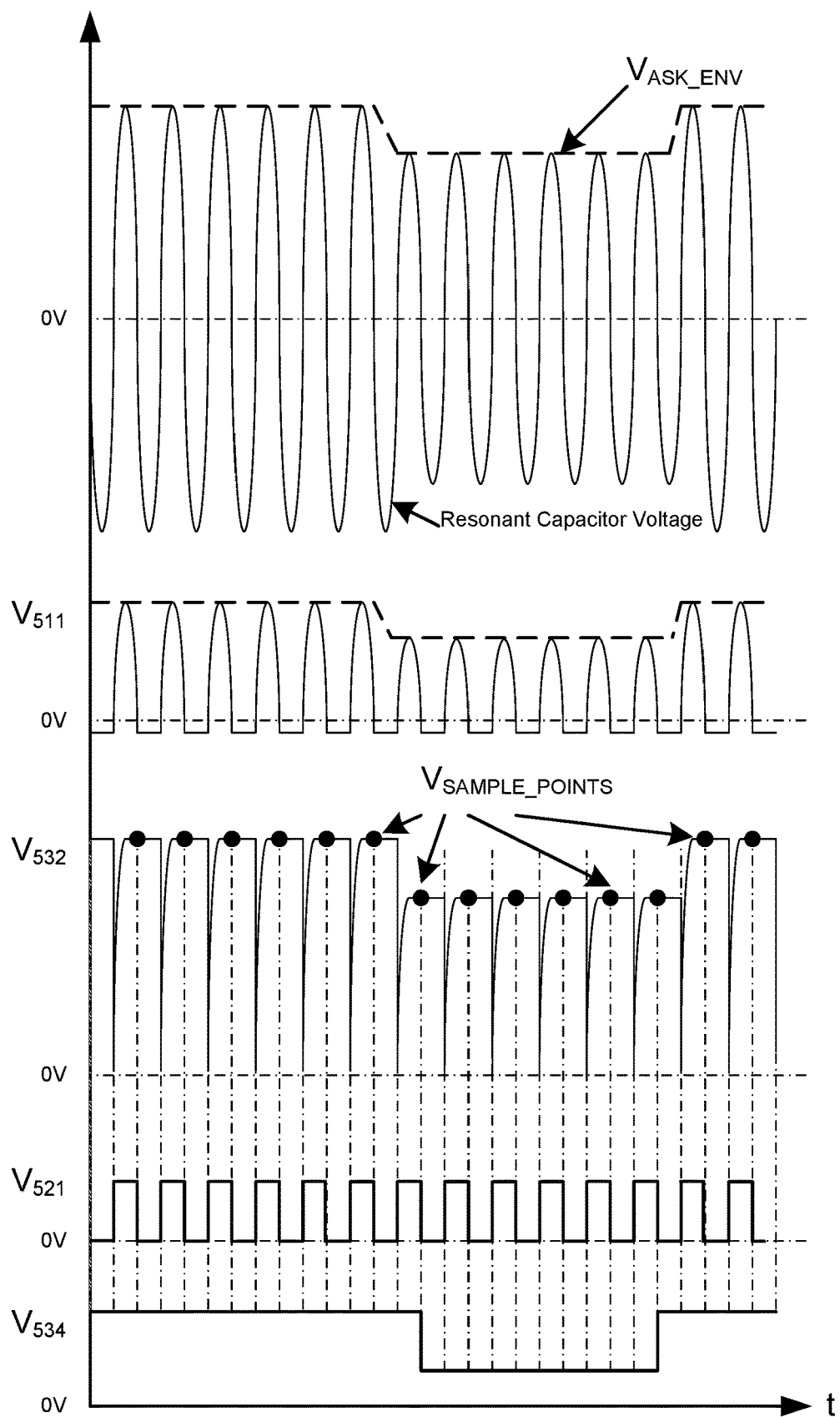
FIG. 11 is a diagram of example voltage waveforms of the circuit in FIG. 10 according to an embodiment of the present disclosure.

The method 550 may be implemented by various circuits. FIG. 10 is a diagram of an example circuit 500 that may be used to implement the embodiment ASK demodulation method 550 illustrated in FIG. 9 according to an embodiment of the present disclosure. In this example, the AC signal is an AC voltage. The circuit 500 may be implemented by discrete components, or may be integrated into an IC. The circuit 500 includes a sub-circuit (or subsystem) 510, which may be integrated into an IC, such as a Tx IC. Thus, in this example, only one resistor, i.e., a resistor 501, is needed as an external component for flexibility of achieving proper attenuation. The subsystem 510 includes an attenuating resistor 514, voltage clamping diodes 512 and 513, a peak detection circuit including an op-amp 530 and a diode 531, a zero-crossing detection comparator 520, and a sample & hold circuit 533. FIG. 11 is a diagram of example voltage waveforms of the circuit 500 according to an embodiment of the present disclosure.

The external resistor 501 connects to the AC voltage from a Tx resonant capacitor, e.g., the Tx resonant capacitor 231 in FIG. 3. The waveform of the input AC signal (the AC voltage) is given in FIG. 11 as $V_{AC}$. The resistor 514 works with the external resistor 501 to attenuate the input AC signal properly. The diodes 512 and 513 clamp the AC voltage to a voltage range between 0V and a clamp voltage 515, e.g., 5V, at an input node 511 of the subsystem 510. The output of the peak detection circuit is detected peak value of the AC voltage. The output of the zero-crossing detection comparator 520 is a zero-crossing signal. The voltage at the output of the peak detection circuit, i.e., V532, is equal to the peak value of the voltage at the node 511, and is fed to the sample and hold circuit 533. The rising edge of an output signal (at a node 521) of the zero-crossing detection comparator 520 is used to reset the input of the sample and hold circuit 533 to zero so that each peak of the AC signal is sampled and hold correctly. The sample and hold action is controlled by the falling edge of the output signal of the zero-crossing detection comparator 520 to ensure that the peak value of every cycle of the AC signal is sampled correctly. The output of the sample and hold circuit 533 is a demodulated ASK signal at a node 534. Waveforms of the voltages at the nodes 511, 532, 521, and 534 of the circuit 500 are given in FIG. 11 respectively.

Figure 12:
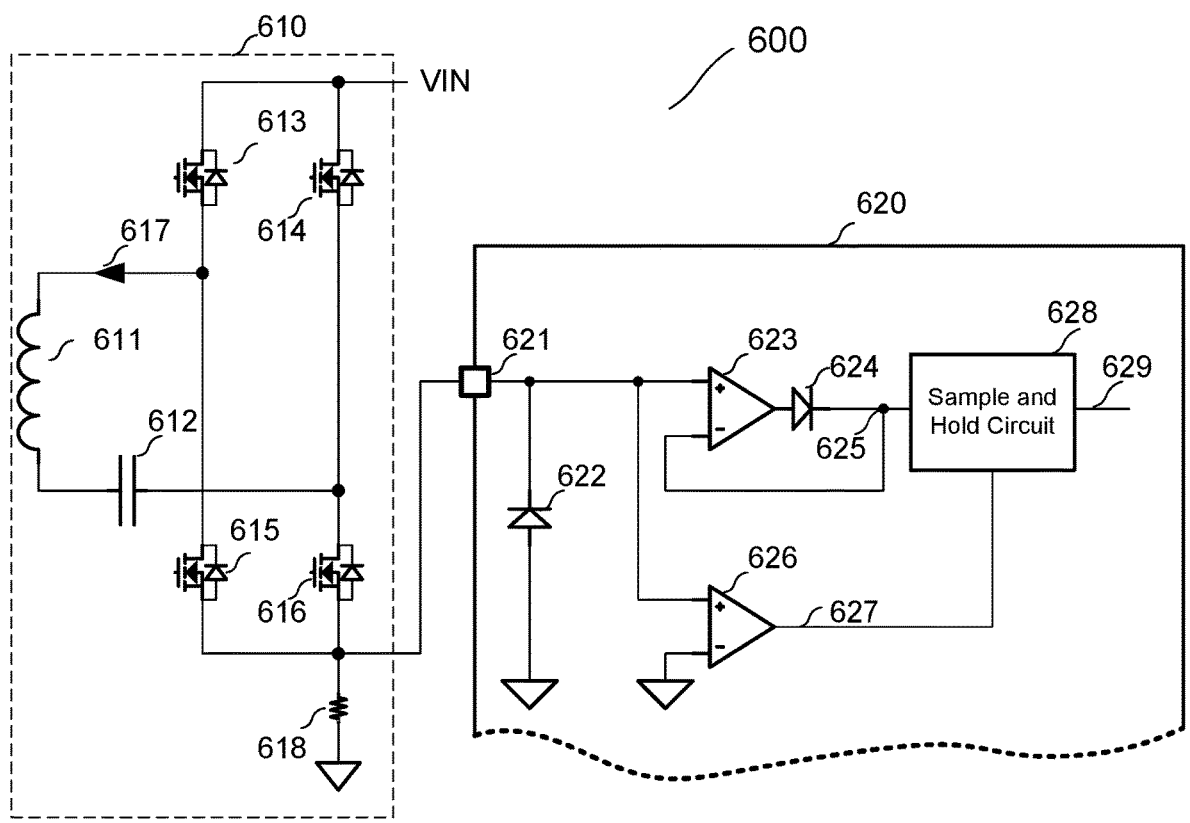
FIG. 12 is a diagram of another example circuit 600 for ASK demodulation according to an embodiment of the present disclosure.

The embodiment circuit 500 of FIG. 10 may also be used to perform ASK demodulation of an AC current, e.g., a Tx coil current, as an AC signal. FIG. 12 is a diagram of an example circuit 600 for ASK demodulation of an AC current according to an embodiment of the present disclosure. In FIG. 12, the circuit 600 includes a subsystem 610 including a wireless power Tx power circuit, and a subsystem 620 including a Tx coil current ASK demodulation circuit. The subsystem 610 includes a Tx coil 611, a Tx resonant capacitor 612, a full-bridge driver including power switches 613, 614, 615 and 616, and a current sense resistor 618. The power switches 613 and 616 as a pair are turned on and off simultaneously. The power switches 614 and 615 as a pair are turned on and off at the same time, and are compliment to the switch pair 613 and 616. The currents of the power switches 615 and 616 generate an AC voltage drop across the resistor 618, and are proportional to a Tx coil current 617. Therefore, the voltage at a node 621 represents the Tx coil current 617 proportionally. The subsystem 620 includes a negative voltage clamp diode 622, a peak detection circuit including an op-amp 623 and a diode 624, a zero-crossing detection comparator 626, and a sample and hold circuit 628. The negative voltage clamp diode 622 is used to limit the voltage at the node 621 to a value higher than −300 mv, for example, such that only the positive portion of the AC signal across the current sense resistor 618 is used for ASK demodulation. The functions of the rest components in the subsystem 620 are similar to those of the subsystem 510 in FIG. 10, and are not repeated here. The output 625 of the peak detection circuit is detected peak value of the AC current. The output 627 of the zero-crossing detection comparator 626 is a zero-crossing signal. The output 629 of the sample and hold circuit 628 is the demodulated ASK signal. The subsystem 620 may be implemented in discrete components or integrated into an IC (e.g., a Tx IC).

FIG. 13 are diagrams of two example implementations of the capacitor ASK modulation block 320 in FIG. 5 according embodiments of the present disclosure. Two embodiment implementations of the switches 322(1) to 322(N) with MOSFET switches have been mentioned previously, and are shown respectively as circuits 700 and 750 in FIG. 13. For simplicity, only the wireless power receiver Rx circuit block 310 is repeated in FIG. 13. The other two function blocks 330 and 340 are omitted in FIG. 13 merely for illustration convenience. The circuit 700 includes a wireless receiver resonant and rectifier block 710 and a capacitive ASK modulation block 720. The circuit 750 includes a wireless receiver resonant and rectifier block 760 and a capacitive ASK modulation block 770.

The wireless receiver resonant and rectifier blocks 710 and 760 operate similarly to the bock 310. The wireless receiver resonant and rectifier block 710 includes a Rx coil 711, a Rx resonant capacitor 712, four sync rectifier switches 713-716, and an output filtering capacitor 717. The Rx coil 711 and the Rx resonant capacitor 712 form a Rx resonant circuit. The wireless receiver resonant and rectifier block 710 is configured to fulfill the purpose of receiving the power transmitted by a wireless power Tx. The output of the block 710 is a DC voltage VRECT at an output node 735 of the wireless receiver resonant and rectifier block 710. A system load 702 is connected between the output node 735 and the ground, with a system load current 701 flowing through the system load 702. The wireless receiver resonant and rectifier block 760 has the same components as the wireless receiver resonant and rectifier block 710 (but with different part numbers) and thus will not be repeated.

The capacitive ASK modulation block 720 includes a first group of sub-circuits connected between a switching node 719 and the ground, and a second group of sub-circuits connected between a switching node 718 and the ground. The first group of sub-circuits may include N sub-circuits, each of which includes an ASK modulation capacitor and a switch connected in series between the switching node 719 and the ground, e.g., a sub-circuit includes a capacitor 721(1) and a switch 723(1) connected in series, another sub-circuit includes a capacitor 721(N) and a switch 723(N) connected in series, and so on. N is an integer greater than zero. The second group of sub-circuits may include N sub-circuits, each of which includes an ASK modulation capacitor and a switch connected in series between the switching node 318 and the ground, e.g., a sub-circuit includes a capacitor 722(1) and a switch 724(1) connected in series, another sub-circuit includes a capacitor 722(N) and a switch 724(N) connected in series, and so on.

The capacitive ASK modulation block 720 is configured to achieve amplitude modulation of the power transfer signal by switching in and out the ASK modulation capacitors 721(1), 721(2), . . . , 721(N), 722(1), 722(2), . . . , 722(N). One or more sub-circuits of the first group of sub-circuits and/or the second group of sub-circuits may be connected to the Rx resonant circuit by turning on the corresponding switch(es), such that one or more of these capacitors are connected to the Rx resonant circuit. Control signals 725(1), . . . , 725(N), 726(1), . . . , 726(N) may be provided to control to switch on or off the switches 723(1), . . . , 723(N), 724(1), . . . , 724(N), respectively, which consequently switches in or out their corresponding ASK modulation capacitors.

The capacitive ASK modulation block 770 includes N sub-circuits connected between nodes 768 and 769. Each of the N sub-circuits includes an ASK modulation capacitor and a back to back connected power MOSFE switch connected in series. For example, a sub-circuit includes an ASK modulation capacitor 771(1) and a back to back connected power MOSFE switch 772(1); and another sub-circuit includes an ASK modulation capacitor 771(N) and a back to back connected power MOSFE switch 772(N). N is an integer number greater than or equal to 1. Control signals 773(1), . . . , 773(N) may be provided to control the respective power MOSFET switches.

The capacitor ASK modulation block 770 is configured to achieve amplitude modulation of the power transfer signal by switching in and out the ASK modulation capacitors 771(1), . . . 771(N). One or more such sub-circuits may be connected to the Rx resonant circuit by turning on corresponding switch(es), such that one or more of these capacitors are connected to the Rx resonant circuit. Control signals 773(1), . . . , 773(N) may be provided to control to switch on or off the switches 772(1), . . . , 7772(N), respectively, which consequently switch in or out their corresponding ASK modulation capacitors.

Figure 14:
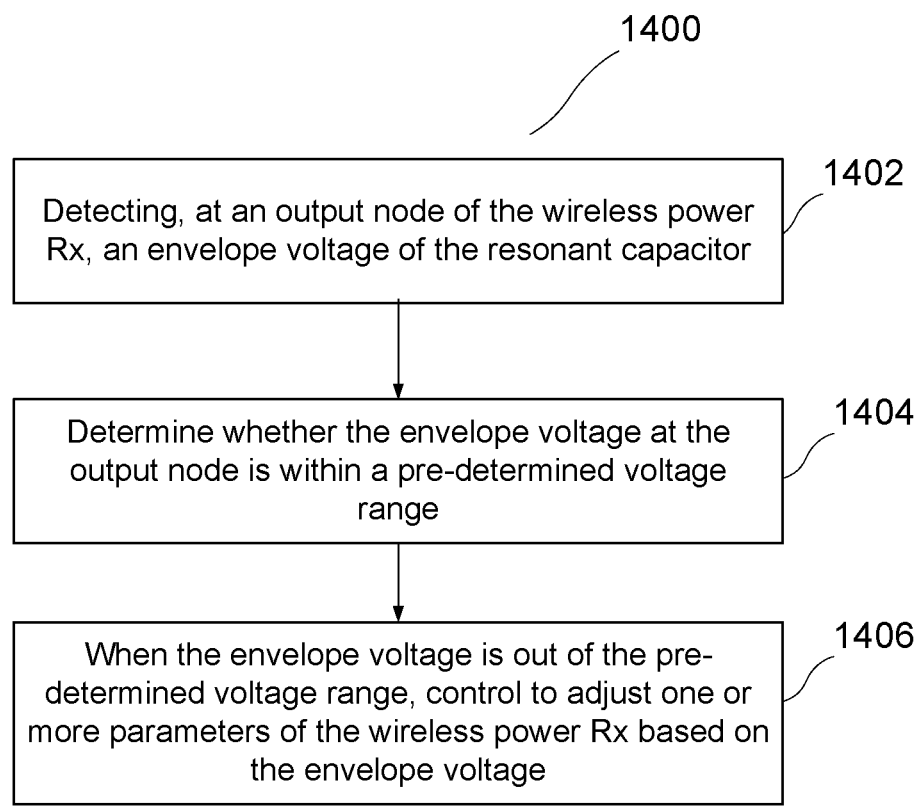
FIG. 14 is a diagram of an example ASK modulation method according to an embodiment of the present disclosure.

FIG. 14 is a diagram of an example ASK modulation method 1400 according to an embodiment of the present disclosure. The method 1400 may be performed at a wireless power Rx of a wireless charging system, by a program through a MCU (Firmware) or a state-machine (Hardware). The wireless power Rx may include a receiving coil and a resonant capacitor connected in series, and a full-bridge rectifier, e.g., the circuit 310 in FIG. 5. The method 1400 may include detecting, at an output node of the wireless power Rx, an envelope voltage of the resonant capacitor (block 1402). The method 1400 may include determining whether the envelope voltage at the output node is within a pre-determined voltage range (block 1404). The method 1400 may include, when the envelope voltage is out of the pre-determined voltage range, controlling to adjust one or more parameters of the wireless power Rx based on the envelope voltage (block 1406), in order for the envelope voltage at the output node of the wireless power receiver to fall within the pre-determined voltage range. The one or more parameters may include a capacitance across the receiving coil and the resonant capacitor, or a current of a sub-circuit connected between the output node and a ground.

Figure 15:
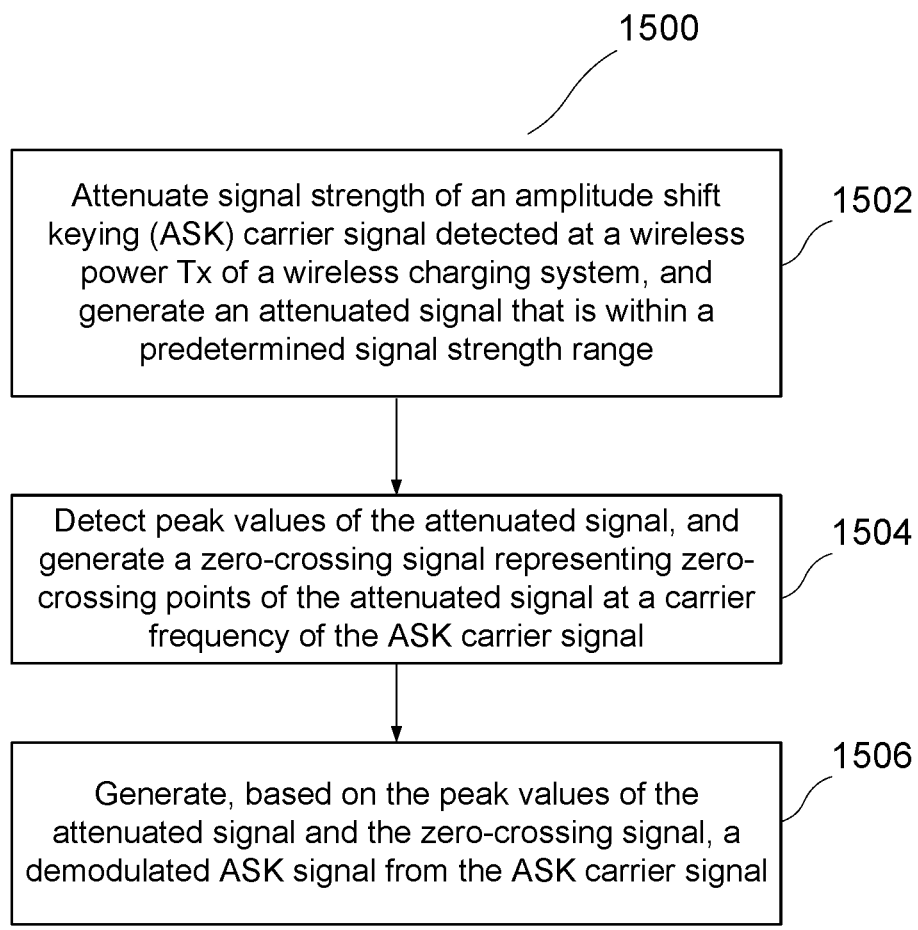
FIG. 15 is a diagram of an example ASK demodulation method according to an embodiment of the present disclosure.

FIG. 15 is a diagram of an example ASK demodulation method 1500 according to an embodiment of the present disclosure. The method 1500 may be performed at a wireless power Rx of a wireless charging system, by a program through a MCU (Firmware) or a state-machine (Hardware). The method 1500 may include attenuating signal strength of an amplitude shift keying (ASK) carrier signal detected at a wireless power Tx of a wireless charging system, and generating an attenuated signal that is within a predetermined signal strength range (block 1502). The ASK carrier signal is sent by a wireless power Rx of the wireless charging system. The method 1500 may further include detecting peak values of the attenuated signal, and generating a zero-crossing signal representing zero-crossing points of the attenuated signal at a carrier frequency of the ASK carrier signal (block 1504). The method 1500 may also include generating, based on the peak values of the attenuated signal and the zero-crossing signal, a demodulated ASK signal from the ASK carrier signal (block 1506).

Embodiments of the present disclosure provide ASK modulation and demodulation mechanism for wireless charging. As shown in the circuit 300 of FIG. 3, as an example, $2^N$ time capacitive ASK modulation depth control options, as well as $2^M$ time resistive ASK modulation depth control options are provided. The ASK modulation depth may be controlled by monitoring the voltage VRECT. One example of monitoring the voltage VRECT is to use an ADC. The VRECT voltage may be sampled during the period without ASK modulation and a period with ASK modulation, and an ASK modulation depth option, such as capacitive, or resistive, or a combination of both, may be selected to keep the ASK modulation depth relatively constant, resulting in good ASK modulation quality under various Rx output voltage and current conditions. The embodiment demodulation method of the present disclosure, e.g., the method illustrated in FIG. 9, eliminates the need of low/high-pass filters for removing the high frequency carrier signal, thus eliminating the distortion caused by the low/high-pass filters. The embodiment demodulation method may directly decode the modulated ASK signal at the carrier frequency rate without using any voltage reference. For example, time information of zero crossing of the high frequency carrier signal may be used to decode the modulated ASK signal. Embodiments of the present disclosure improve ASK modulation and demodulation quality, without having the issues with the conventional schemes as discussed previously.

The foregoing has outlined the ASK modulation and demodulation methods in details so that those skilled in the art can readily use the disclosed conception and specific embodiment as a basis for designing or modifying other structures for carrying out such methods in either wireless charging system or other system applications. Those skilled in the art should also realize that such equivalent constructions do not depart from the spirit and scope of the disclosure in its broadest form even though embodiments of any applications that are either outside the wireless charging applications or beyond the frequency range of the WPC standard.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   detecting, at an output node of a wireless power receiver of a wireless charging system, an envelope voltage of a resonant capacitor of the wireless power receiver, the wireless power receiver comprising a receiving coil and the resonant capacitor connected in series, and a full-bridge rectifier;
   determining whether the envelope voltage at the output node is within a pre-determined voltage range; and
   when the envelope voltage is out of the pre-determined voltage range, controlling to adjust one or more parameters of the wireless power receiver based on the envelope voltage, in order for the envelope voltage at the output node of the wireless power receiver to fall within the pre-determined voltage range, the one or more parameters comprising a capacitance across the receiving coil and the resonant capacitor, or a current of a sub-circuit connected between the output node and a ground; and
   wherein detecting the envelope voltage at the output node comprises:
   detecting the envelope voltage at the output node in response to receiving an amplitude shift keying (ASK) communication request requesting ASK communication between the wireless power receiver of the wireless charging system and a wireless power transmitter of the wireless charging system.

2. The method of claim 1, wherein controlling to adjust the one or more parameters of the wireless power receiver comprises:
   controlling to adjust the capacitance across the receiving coil and the resonant capacitor by switching on or off at least one sub-circuit connected between the resonant capacitor and the ground or between the receiving coil and the ground, the at least one sub-circuit comprising a capacitor and a switch connected in series.

3. The method of claim 2, wherein switching on or off the at least one sub-circuit comprises:
   switching on or off a first sub-circuit of the at least one sub-circuit, the first sub-circuit being connected between the resonant capacitor and the ground; and
   switching on or off a second sub-circuit of the at least one sub-circuit, the second sub-circuit being connected between the receiving coil and the ground.

4. The method of claim 2, wherein controlling to adjust the capacitance across the receiving coil and the resonant capacitor comprises:
   generating, at least one control signal to switch on or off the switch of the at least one sub-circuit, based on the envelope voltage at the output node, an operation frequency of the wireless power receiver, or a system load current flowing through the output node.

5. The method of claim 1, wherein controlling to adjust the one or more parameters of the wireless power receiver comprises:
   controlling to adjust the current of the sub-circuit connected between the output node and the ground by switching on or off the sub-circuit connected between the output node and the ground, the sub-circuit comprising a current sink and a switch connected in series or comprising a resistor and a switch connected in series.

6. The method of claim 5, wherein controlling to adjust the current comprises:
   generating a first control signal to switch on or off the switch of the sub-circuit and a second control signal to control a setting of the current sink, based on the envelope voltage at the output node, an operation frequency of the wireless power receiver, or a system load current flowing through the output node of the wireless power receiver.

7. The method of claim 1, further comprising:
   when the envelope voltage at the output node is within the pre-determined voltage range, starting the ASK communication between the wireless power receiver and the wireless power transmitter.

8. The method of claim 1, further comprising:
   detecting the envelope voltage at the output node of the wireless power receiver after adjusting the one or more parameters of the wireless power receiver; and
   when the envelope voltage is out of the pre-determined voltage range, repeating adjusting the one or more parameters of the wireless power receiver based on the envelope voltage.

9. The method of claim 1, wherein controlling to adjust the one or more parameters of the wireless power receiver is performed before an ASK communication starts between the wireless power receiver and a wireless power transmitter of the wireless charging system or during the ASK communication.

10. The method of claim 1, further comprising:
    sending, to a wireless power transmitter of the wireless charging system, a message indicating a modulation quality at the wireless power receiver, the message being based on the envelope voltage detected at the output node.

11. A method comprising:
    detecting, at an output node of a wireless power receiver of a wireless charging system, an envelope voltage of a resonant capacitor of the wireless power receiver, the wireless power receiver comprising a receiving coil and the resonant capacitor connected in series, and a full-bridge rectifier, and the output node outputting a DC voltage;
    determining whether the envelope voltage at the output node is within a pre-determined voltage range; and
    when the envelope voltage is out of the pre-determined voltage range, controlling to adjust, based on the envelope voltage, a current of a sub-circuit connected between a ground and the output node outputting the DC voltage, in order for the envelope voltage at the output node to fall within the pre-determined voltage range.

12. The method of claim 11, wherein controlling to adjust the current of the sub-circuit comprises:
controlling to switch on or off the sub-circuit connected between the ground and the output node, the sub-circuit comprising a current sink and a switch connected in series or comprising a resistor and a switch connected in series.

13. The method of claim 12, further comprising:
generating a first control signal to switch on or off the switch of the sub-circuit and a second control signal to control a setting of the current sink, based on the envelope voltage at the output node, an operation frequency of the wireless power receiver, or a system load current flowing through the output node of the wireless power receiver.

14. The method of claim 11, wherein detecting the envelope voltage at the output node comprises:
detecting the envelope voltage at the output node in response to receiving an amplitude shift keying (ASK) communication request requesting ASK communication between the wireless power receiver of the wireless charging system and a wireless power transmitter of the wireless charging system.

15. The method of claim 14, further comprising:
when the envelope voltage at the output node is within the pre-determined voltage range, starting the ASK communication between the wireless power receiver and the wireless power transmitter.

16. The method of claim 11, further comprising:
detecting the envelope voltage at the output node of the wireless power receiver after adjusting the current of the sub-circuit; and
when the envelope voltage is out of the pre-determined voltage range, repeating adjusting the current of the sub-circuit based on the envelope voltage.

17. The method of claim 11, wherein controlling to adjust the current of the sub-circuit is performed before an ASK communication starts between the wireless power receiver and a wireless power transmitter of the wireless charging system or during the ASK communication.

18. The method of claim 11, further comprising:
sending, to a wireless power transmitter of the wireless charging system, a message indicating a modulation quality at the wireless power receiver, the message being based on the envelope voltage detected at the output node.

* * * * *